G. W. ALBAUGH.
Land Roller and Pulverizer.
No. 214,802. Patented April 29, 1879.
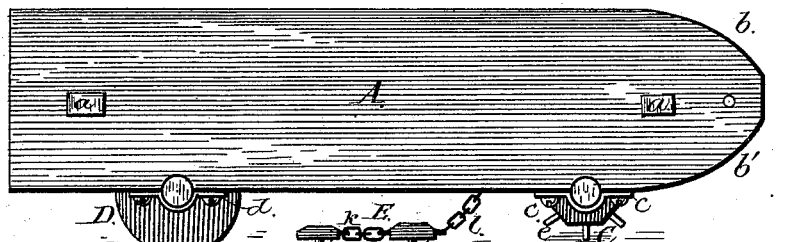
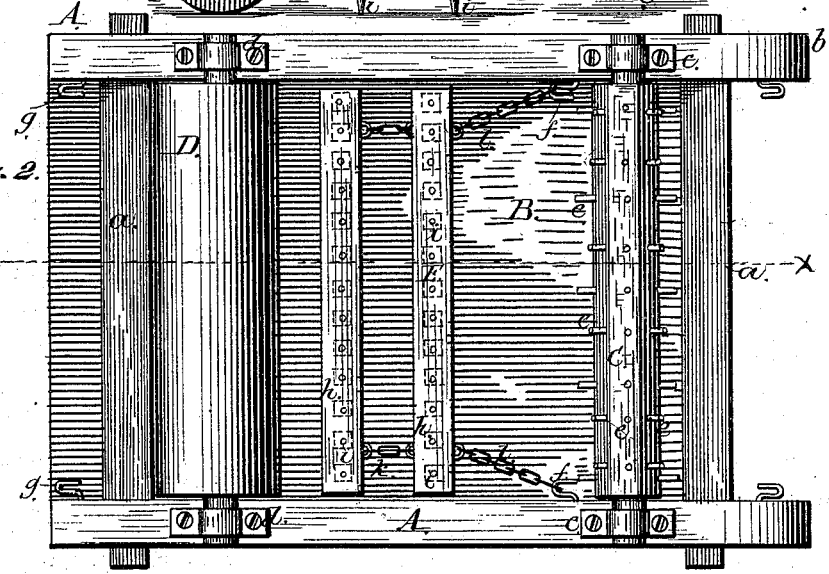
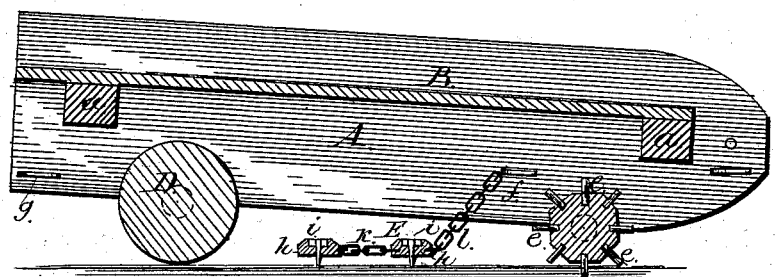

UNITED STATES PATENT OFFICE.

GEORGE W. ALBAUGH, OF MARTINSBURG, WEST VIRGINIA.

IMPROVEMENT IN LAND ROLLER AND PULVERIZER.

Specification forming part of Letters Patent No. 214,802, dated April 29, 1879; application filed March 18, 1879.

*To all whom it may concern:*

Be it known that I, GEORGE W. ALBAUGH, of Martinsburg, in the county of Berkeley and State of West Virginia, have invented certain new and useful Improvements in Land Roller and Pulverizer; and I do hereby declare that the following is a full, clear, and exact description of my invention, which will enable others skilled in the art to which it appertains to make and use the same, reference being had to the accompanying drawings, which form a part of this specification, and in which—

Figure 1 is a side elevation. Fig. 2 is a bottom view; and Fig. 3 is a longitudinal section on the line $x$ $x$ in Fig. 2.

Similar letters of reference indicate corresponding parts in all the figures.

This invention relates to devices for pulverizing the soil, and making it in fit condition to receive the seed and fertilizers sowed with the seed; and it consists in the combination in one implement of a clod breaker and pulverizer, an adjustable harrow, and a roller, substantially as hereinafter more fully described.

In the drawings, A A are the side pieces of my improved machine, which are united by cross beams or bars $a$ $a$, to form a frame, supporting a plank platform, B. The side pieces A A are made with arched or double-beveled front ends, as shown at $b$ $b'$, and are shod with iron on both sides to increase the strength and durability. Upon one side of the side pieces or runners A A are made boxes $c$ $c$ $d$ $d$, in which are journaled the pivots of the rotary clod breaker and pulverizer C and of the roller D, respectively. The rotary clod breaker and pulverizer consists of a roller made octagonal in cross-section, as will be seen by reference to Fig. 3 of the drawings, and provided on each of its sides or faces with a series of teeth, $e$ $e$, so set or arranged upon their respective faces as to alternate with each other.

Secured in the runners A A, a short distance back of the rotary clod breaker and pulverizer C, are two stout hooks, $f$ $f$, and in the rear part of said runners, back of the roller D, is another pair of hooks, $g$ $g$.

E is the harrow, which consists of two or more parallel bars, $h$ $h$, flat on their under side, which is armed with teeth $i$, but beveled on their upper edges, and united by chain-links $k$ $k$. Secured at each end of the front bar, $h$, is another short chain, $l$ $l$, the front end of which is hooked upon the hooks $f$ $f$, as shown in the drawings, so as to place the harrow E between the clod-breaker C and the roller D.

If desired, however, the harrow may be unshipped from that position and secured in the rear end of the machine by affixing the connecting-chains $l$ $l$ upon the hooks $g$ $g$. By reversing the harrow in either position, with its beveled or rounded surface against the ground, it may be used as an ordinary drag.

This machine, being exceedingly simple in its construction, is strong and durable, and may be used with advantage on all kinds of soil.

If desired, rocks, stumps, or other weights may be placed, with or without a removable driver's seat, upon the platform B; and in transporting the machine to or from the field it is simply reversed, when all its operating parts, except the runners, will be out of action.

Having thus described my invention, I claim and desire to secure by Letters Patent of the United States—

The combination, with the frame A A B, constructed as described, and provided with the journal-boxes $c$ $c$ $d$ $d$ and a double set of hooks, $f$ $f$ $g$ $g$, of the toothed clod breaker and pulverizer C, adjustable harrow E, and roller D, substantially as and for the purpose set forth.

In testimony that I claim the foregoing as my own I have hereto affixed my signature in presence of two witnesses.

GEORGE W. ALBAUGH.

Witnesses:
 LUTHER MILLER,
 R. M. PRICE.